United States Patent
Berken et al.

Patent Number: 5,134,645
Date of Patent: Jul. 28, 1992

[54] AUTOMATIC AND SUSTAINED ASSOCIATION OF USERS WITH COMMUNICATIONS PATHS

[76] Inventors: James J. Berken, 337 W. Greenfield Ave., Lombard, Ill. 60148; Kenneth J. Marx, 042 Oak Shores Dr., Mundelein, Ill. 60060; James E. Thomas, 35W941 Crispin Dr., Elgin, Ill. 60123; Thomas A. Freeburg, 416 N. Belmont, Arlington Heights, Ill. 60004

[21] Appl. No.: 374,428

[22] Filed: Jun. 30, 1989

[51] Int. Cl.$^5$ ................................. H04Q 7/04
[52] U.S. Cl. ................................. 379/58; 379/211; 379/60
[58] Field of Search .......... 379/57, 60, 59, 58, 379/61, 63, 210, 211, 245; 458/33

[56] References Cited

U.S. PATENT DOCUMENTS

| | | | |
|---|---|---|---|
| 4,275,385 | 6/1981 | White | 340/312 |
| 4,601,064 | 7/1986 | Shipley | 455/608 |
| 4,646,345 | 2/1987 | Zouner et al. | 379/62 |
| 4,649,385 | 3/1987 | Aires et al. | 379/57 |
| 4,658,416 | 4/1987 | Tanaka | 379/211 X |
| 4,680,785 | 7/1987 | Akiyama et al. | 379/57 |
| 4,723,264 | 2/1988 | Sasuta et al. | 379/58 |
| 4,723,273 | 2/1988 | Diesel et al. | 379/211 |
| 4,748,655 | 5/1988 | Thrower et al. | 379/60 |
| 4,752,951 | 6/1988 | Konneker | 379/211 |
| 4,796,291 | 1/1989 | Makino | 379/58 |
| 4,827,499 | 5/1989 | Warty et al. | 379/58 |
| 4,833,701 | 5/1989 | Comroe et al. | 379/60 |
| 4,833,702 | 5/1989 | Shitara et al. | 379/60 |
| 4,856,048 | 8/1989 | Yamamoto et al. | 379/60 |
| 4,860,337 | 8/1989 | Shimura | 379/63 |
| 4,893,336 | 1/1990 | Wuthnow | 379/210 X |
| 4,959,856 | 9/1990 | Bischoff et al. | 379/245 |

FOREIGN PATENT DOCUMENTS

| | | |
|---|---|---|
| 2929961 | 7/1979 | Fed. Rep. of Germany . |
| 61-245696 | 10/1986 | Japan . |
| 62-23663 | 1/1987 | Japan . |

*Primary Examiner*—James L. Dwyer
*Assistant Examiner*—M. Shehata
*Attorney, Agent, or Firm*—F. John Motsinger

[57] ABSTRACT

In a network of interconnected wireless networks and wired telephone networks, there is provided a mechanism for sustained association of users with communications paths. It comprises: upon an attempted use of an unassociated telephone, identifying oneself to the network (via the wireless network) and activating one's telephone line by keying one's own telephone number through the telephone keypad, locating his telephone line by monitoring unassociated lines for activity, and the one so identified receiving a sustaining association (for more than a few communications) with the telephone line so located.

2 Claims, 2 Drawing Sheets

WIRELESS TELEPHONE SYSTEM CONFIGURATION

AUTOMATIC AND SUSTAINED ASSOCIATION OF USERS WITH COMMUNICATIONS PATHS

THE FIELD OF INVENTION

This invention is concerned with association of identifications with communications channels.

More particularly, in a network of interconnected wireless networks and wired telephone networks, this invention is concerned with making associations between as-yet-unassociated telephones and as-yet-unassociated telephone liens over a wireless network.

BACKGROUND OF THE INVENTION

Traditionally, a telephone system administrator had to manually associate an as-yet-unassociated (or newly installed) wire pair with a user's telephone number. For each new telephone (or each relocated telephone), this might involve several days of: pulling out to the proximity of the new user a new wire pair (or determining unallocated or previously allocated pairs among those already installed); and programming (or physically wiring) the user-to-wire pair association. Thus, manual association required coordination between the telephone service provider, the plant telecommunications department and the user. Accurate records seldom are, but should be, kept to track physical connections.

This invention takes as its object to overcome these shortcomings and to realize certain advantages presented below.

SUMMARY OF THE INVENTION

In a network of interconnected wireless networks and wired telephone networks, there is provided a mechanism for sustained association of users with communications paths. It comprises: upon an attempted use of an unassociated telephone, identifying oneself to the network (via the wireless network) and activating one's telephone line by keying one's own telephone number through the telephone keypad, locating his telephone line by monitoring unassociated lines for activity, and the one so identified receiving a sustaining association (for more than a few communications) with the telephone line so located.

DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the accompanying drawings in which.

DETAILED DESCRIPTION

Figure 1:
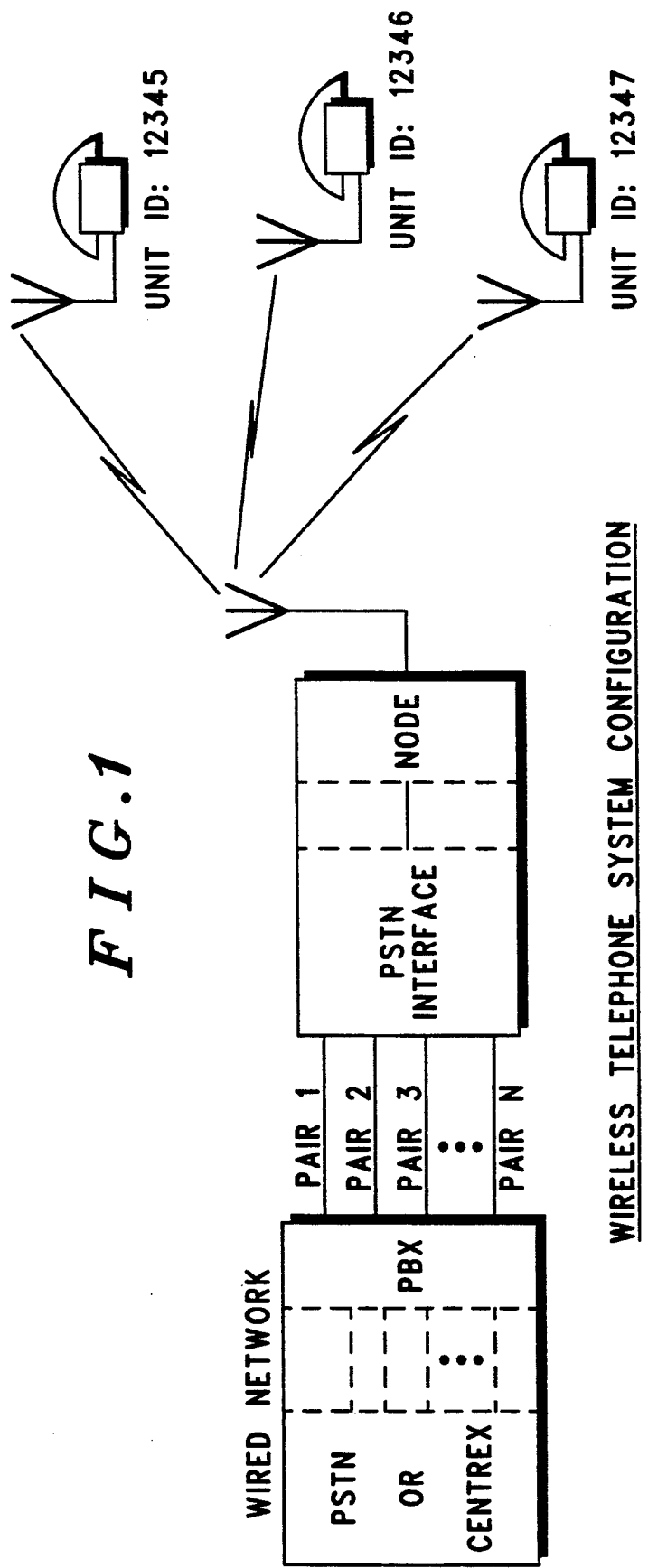
FIG. 1 is a block diagram of the network in which the preferred embodiment of the invention operates.

FIG. 1 is a block diagram of the network in which the preferred embodiment of the invention operates.

FIG. 1 illustrates a PSTN interface to the wired telephone network (Public Switched Telephone Network—PSTN—network, Centrex or optional local Private Branch eXchange—PBX) and wire pairs connected therebetween. A wireless communication node (NODE) is coupled to the local telephone network through the PSTN interface and provides wireless communications with the telephones. The telephones communicate with the NODE over the wireless network via switched packet communications between the NODE and a wireless transceiver associated with each telephone—i.e., the User Interface Module UIM (shown) diagrammatically as antennae.

Figure 2:
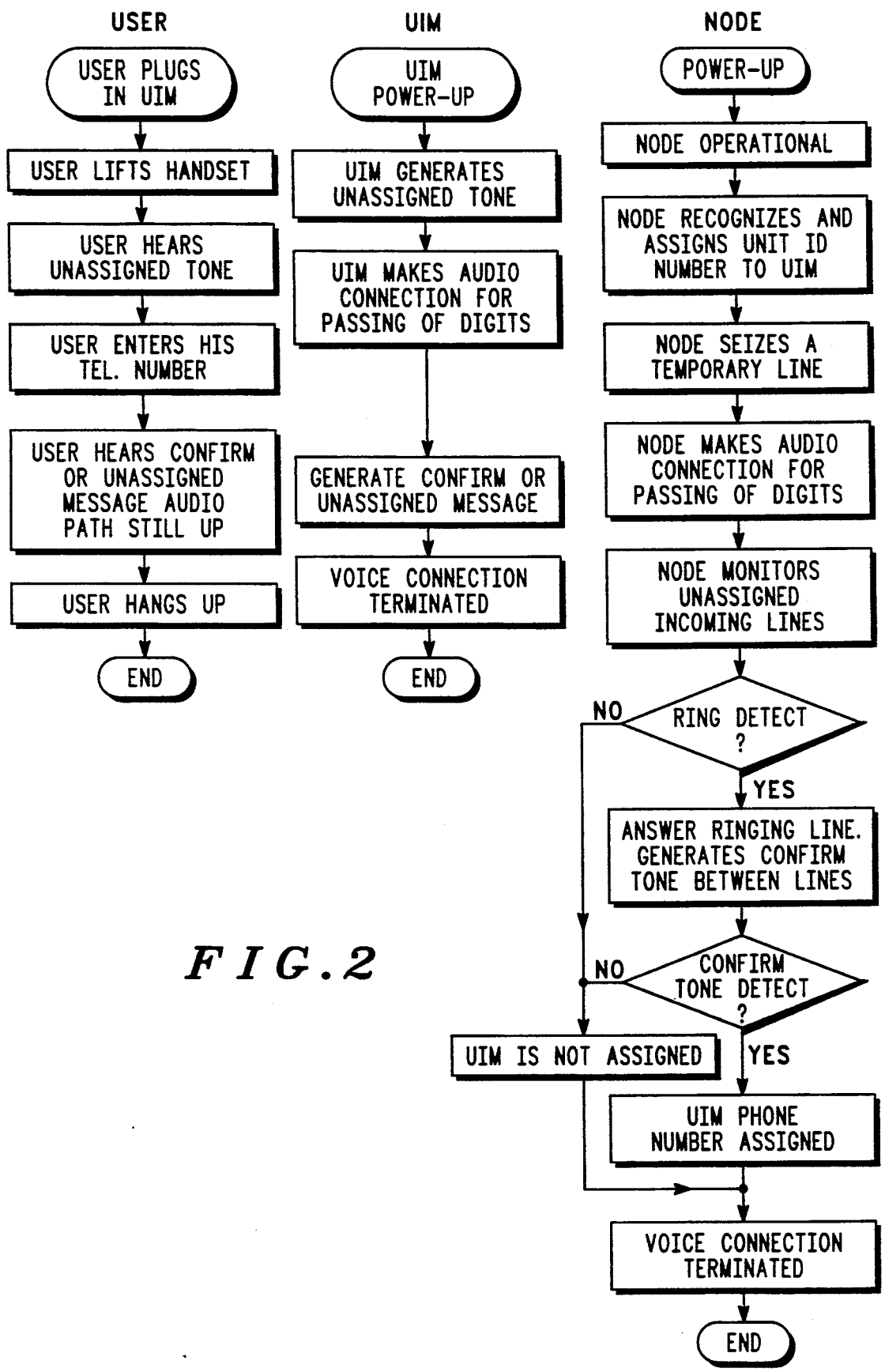
FIG. 2 is an event diagram of the association mechanism in accordance with the preferred embodiment of the invention.

FIG. 2 is an event diagram of the association mechanism in accordance with the preferred embodiment of the invention.

Events proceed in parallel from top to bottom as follows:

First, the NODE is powered up and becomes operational with the wired telephone network. Next, the user plugs his telephone into his User Interface Module (UIM) and powers up the UIM. Upon power up, the UIM synchronizes to the switched packet wireless network and transmits an initiation sequence which the NODE recognizes and to which the NODE responds by assigning a unit ID to the UIM; this permits selective wireless communications to be routed between the NODE and the UIM via the wireless network.

The telephone (or the user's telephone number) has yet to be associated with his incoming wire pair. Events continue when the user first attempts to use his telephone by lifting the handset. A temporary telephone line (an inactive line or a dedicated control line) is seized on which to temporarily communicate, while the UIM generates a distinctive tone for the user, indicating that the telephone is, at present, unassociated with any particular telephone number. The user responds by keying his telephone number; the keyed digits are passed by the wireless network to the telephone network; in other words, the user, via an temporary line, calls himself. When the PSTN interface detects ringing on his as-yet-unassociated line, it answers the ringing line and passes a confirmation tone between the answered line and the temporary line. This confirms that he has, in fact, answered the incoming line intended for him. The association between the wire pair and the user's telephone (along with the unit ID used via the wireless network) is noted and recorded. Finally, the UIM generates a message to the user that a sustaining association has been made between his telephone identification number and this communications path; otherwise the user is given negative confirmation that no association has been made and that the sequence of events ought to be repeated.

A sustaining association (for more than a few communications) of the incoming telephone line to his unit ID is in marked contrast to other wireless channel assignment methods where a trunked channel assignment is made for a single wireless transmission (transmission trunking) or, like cellular radiotelephone, for the duration of a conversation (session trunking).

The attendant advantages of this invention include an automatic and immediate association of user telephone number with telephone lines without the intervention of an administrator or any of the normal organizations that ordinarily need to be coordinated to establish service, and the elimination of any requirement to keep records of physical connections and the numerical order and sequence of incoming telephone lines or records of the associations between certain lines (wire pairs) and their user telephone numbers.

Thus, in a network of interconnected wireless networks and wired telephone networks, there has been provided a mechanism for sustained association of users with communications paths. It comprises: upon an attempted use of an unassociated telephone, identifying oneself to the network (via the wireless network) and activating one's telephone line by keying one's own telephone number through the telephone keypad, locating his telephone line by monitoring unassociated lines for activity, and the one so identified receiving a sustaining association (for more than a few communications) with the telephone line so located.

While the preferred embodiment of the invention has been described and shown, it will be appreciated by those skilled in this field that other variations and modifications of this invention may be implemented. For example, a mechanism could be provided to protect against entry of the same telephone number at more than one telephone or, in the alternative, a prioritization scheme for multiple entries could be implemented to cause serial hunting for that user at several telephones.

These and all other variations and adaptations are expected to fall within the ambit of the appended claims.

What we claim and desire to secure by Letters Patent is:

1. In a network of interconnected wireless networks and wired telephone networks, a method of sustained association of one's user telephone with his communications path comprising:

upon an attempted use of an unassociated telephone, identifying oneself to the network (via the wireless network) and activating one's telephone line by keying one's own telephone number through the telephone keypad, locating his telephone line by monitoring unassociated lines for ringing activity, and the telephone through which such identification took place receiving a sustaining association (for more than a few communications) with the telephone line so located.

2. In a network of interconnected wireless networks and wired telephone networks, an apparatus for sustained association of one's user telephone with his communications path comprising, coupled in series:

means for receiving (via the wireless network), upon an attempted use of an unassociated telephone, one's identification, means for activating one's telephone line via one's own telephone number, keyed through the telephone keypad, means for locating his telephone line by monitoring unassociated lines for ringing activity, means for establishing a sustaining association (for more than a few communications) with the telephone line so located.

* * * * *